United States Patent [19]

Six et al.

[11] Patent Number: 4,557,023
[45] Date of Patent: Dec. 10, 1985

[54] TIE STRAP, PARTICULARLY FOR TYING ELONGATED OBJECTS

[75] Inventors: Jörg Six, Norderstedt; Gerd Kobarg, Tornesch, both of Fed. Rep. of Germany

[73] Assignee: Paul Hellerman GmbH, Pinneberg, Fed. Rep. of Germany

[21] Appl. No.: 610,389

[22] Filed: May 15, 1984

[30] Foreign Application Priority Data

May 17, 1983 [DE] Fed. Rep. of Germany ... 8314534[U]

[51] Int. Cl.⁴ .............................................. B65D 63/00
[52] U.S. Cl. .............................. 24/16 PB; 24/17 AP; 24/30.5 P; 248/74.3
[58] Field of Search ........... 24/16 PB, 17 AP, 30.5 P; 248/74.3

[56] References Cited

U.S. PATENT DOCUMENTS

| | | | |
|---|---|---|---|
| 3,197,829 | 8/1965 | Caveney et al. | 24/30.5 P |
| 3,224,056 | 12/1965 | Joffe | 24/16 PB |
| 3,258,819 | 7/1966 | Weckesser | 24/16 PB |
| 3,654,669 | 4/1972 | Fulton | 24/16 PB |
| 3,744,096 | 7/1973 | Kok | 24/16 PB |
| 3,747,164 | 7/1973 | Fortsch | 24/16 PB |
| 3,860,997 | 1/1975 | van Riper, Jr. et al. | 24/16 PB |
| 3,900,922 | 8/1975 | McCormick | 24/16 PB |
| 3,973,292 | 8/1976 | Bonnet | 24/16 PB |
| 4,269,379 | 5/1981 | McCormick | 24/16 PB |
| 4,393,548 | 7/1983 | Herb | 24/16 PB |

FOREIGN PATENT DOCUMENTS 2065218 6/1981 United Kingdom .

Primary Examiner—Victor N. Sakran
Attorney, Agent, or Firm—Handal & Morofsky

[57] ABSTRACT

A tie band, particularly for tying elongated objects, such as wiring harnesses, which consists of a strap tongue toothed on both sides, a toothed clamp wedge, and a clamp head which receives the clamp wedge and the strap tongue which is to be clamped and which has two opening surfaces which lie opposite one another and converge in the shape of a wedge, and of which in each case one is provided to support the wedge and the other to form, in conjunction with one wedge surface, a clamp gap for the strap tongue. In order to achieve greater holding power, the opening surfaces are also toothed, expediently so as to form a complementary match for the toothing of the strap tongue.

4 Claims, 9 Drawing Figures

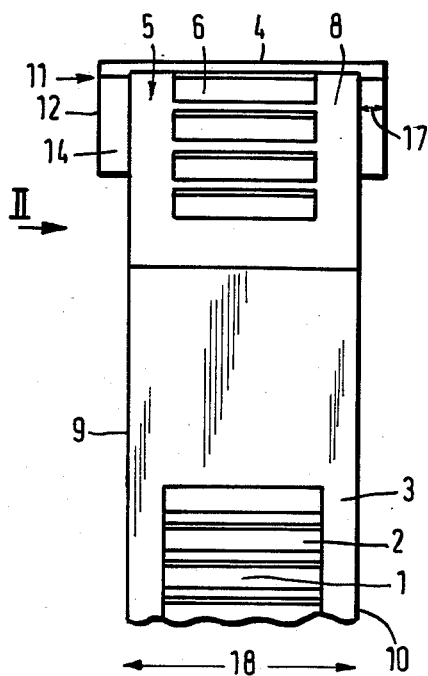
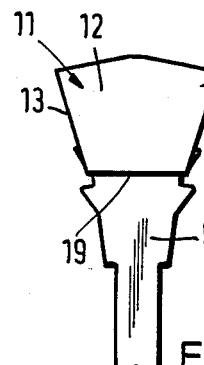
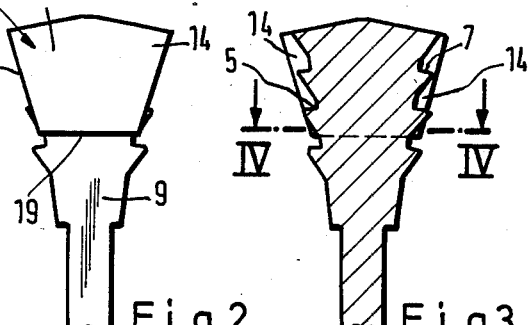
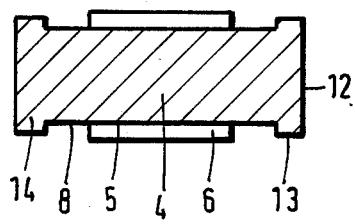
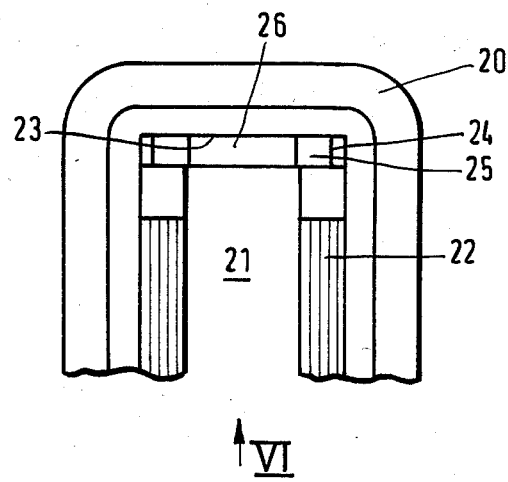
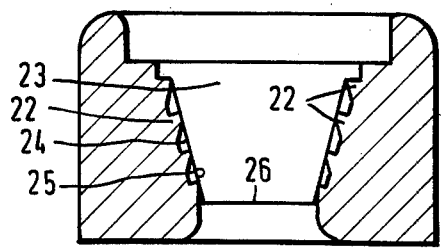

TIE STRAP, PARTICULARLY FOR TYING ELONGATED OBJECTS

DESCRIPTION

The invention relates to a tie strap, particularly for tying elongated objects, such as wiring harnesses, which consists of a strap tongue toothed on both sides, a clamp wedge which is joined by its thinner end to one end of the strap tongue and is toothed on both wedge surfaces, and of a clamp head having a clamp opening bounded by two opening surfaces which lie opposite one another and converge in the shape of a wedge, and of which in each case one is provided to support the wedge and the other to form, in conjunction with one wedge surface, a clamp gap for the strap tongue.

With tie straps in which the strap tongue is held by means of a clamp wedge in the converging clamp opening of the clamp head, the clamping action is due to the fact that with increasing strap tension the clamp wedge is drawn increasingly into the clamp opening, whereby a greater clamping force is applied. In the case of the known tie strap first mentioned above (German Utility Model 82 31,443), the strap tension is on the one hand transmitted from that side of the strap tongue, which is directly integrally joined to it, to the clamp wedge; on the other hand, the clamp wedge is also subjected to the strap tension of the free end, clamped in the clamp head, of the band tongue, because it is in tooth engagement with it. This tooth engagement is important because it cannot under all conditions of load be expected that the two sides of the strap will be equally loaded and that the clamp wedge will be sufficiently drawn into the clamp head by the side of the strap integrally joined to it. Another known tie strap (U.S. Pat. No. 3,258,819), in which the wedge surfaces are not toothed, while one opening surface provided in the clamp head and cooperating with the strap tongue which is to be clamped has toothing matching that of the strap tongue, therefore gives a less secure hold. All tie straps of the type under consideration, which have been successful in practice, therefore follow the principle first set forth above, according to which the tooth engagement takes place between the strap tongue which is to be clamped and the clamp wedge, while the opening surfaces of the clamp head are not toothed. All such straps have the common feature that in each case only one of the surfaces taking part in the formation of the clamp gap for the strap tongue—that is to say either a wedge surface or an opening surface—is toothed, while the opposite surface is not toothed. By this means it is intended to permit the wedging movement of the wedge inside the clamp head to follow the strap tension, as is necessary for the clamping function. The holding power of the known tie strap is limited by the strength of the components used, particularly of the clamp head, which expands under the wedging action, and of the cooperating teeth.

The problem underlying the invention is that of increasing the holding power of the tie strap first mentioned above, without any strengthening of material being required.

The solution according to the invention consists in that not only the wedge surfaces but also the opening surfaces are toothed.

The strap tongue is accordingly situated in the head in a clamp gap toothed on both sides. By means of its teeth it is in engagement with the toothing of the clamp wedge and also with the toothing, which is expediently shaped to match the strap teeth, on the opposite side of the clamp head. The double tooth engagement on both sides of the strap tongue thus joins these three parts positively together, so that their functional relative mobility is eliminated or at least greatly reduced. This is in contrast to the previously known functional principle of the type of tie strap in question, which for the clamp wedging of the strap tongue requires free wedging mobility of the clamp wedge. Taking as starting point this hitherto unchallenged principle, the solution according to the invention therefore appears to be imcompatible.

Having regard to the previous functional principle, the solution provided by the invention also appears surprising, because no defined engagement conditions are ensured. It is fundamentally impossible for the teeth of the strap tongue to be continuously in full engagement both with the teeth of the clamp head and with those of the clamp wedge at all times. On the contrary, in normal cases, on at least one side of the strap tongue there will be an engagement displacement relative to the other. With low strap tensions it is not even possible to be sure of firm seating of the strap tongue in the clamp head.

All these points constitute paradoxical conditions which are apparently unfavorable to oowerful engagement. Nevertheless, tests have shown that the holding power of the tie strap constructed in accordance with the invention is substantially greater than that of the known, otherwise identical tie straps, in fact almost twice as great.

The reasons for this may in part be due to the fact that when the strap is subjected to heavy loads the transmission of forces from the clamped strap tongue takes place mainly directly to the toothing of the clamp head, so that the clamp wedge is relieved of load in comparison with the known straps. The relieving of the wedge of load leads in turn to a reduction of the wedging forces expanding and deforming the clamp head. It is true that on the wedge side, because of the incomplete engagement, deformation of the cooperating teeth of the wedge and the strap tongue must be expected, but, since these teeth are not responsible, or are only responsible to a small extent, for the transmission of forces, this is of no consequence. Nevertheless, the invention cannot dispense with the cooperating toothings on the wedge and on the strap tongue, because it is only with their aid that it is ensured that, even with varying loading and with relative movements inside the clamp head, the clamp wedge will always be brought back into its clamping position.

According to another feature of the invention, provision is made for the opening surfaces and the wedge surfaces to be provided, next to the toothing, with supporting surfaces which project in relation to one another, cooperate with one another on the side not forming the clamp gap, are not toothed, and prevent maximum tooth engagement at least in the condition of low loading of the strap. The effect is thereby achieved that the wedging movement of the clamp wedge is not hindered at least on its side remote from the clamped strap tongue and at least in the state of low tension. In the state of high tension, on the other hand, provision can be made for the clamp wedge teeth and the clamp head teeth which lie directly opposite one another to come into more or less firm engagement with one another in consequence of the deformation of the supporting surfaces, in order thereby to provide for the clamp wedge additional support against the forces pulling it in the wedging direction. In this way, not only is the clamp wedge held more securely in the clamp head, but the wedging forces and thus also the deformation of the clamp head are in addition further reduced. If, in accordance with a preferred embodiment, the teeth on the opening surfaces of the clamp head are made to match the teeth on the strap tongue which has to be clamped, and, in the usual way, these teeth are made with a steep front flank and a flat rear flank, the effect of tooth engagement between the clamp wedge and the opening surface of the clamp head is moreover also not very great because the tooth flanks of the clamp wedge which point in the clamping direction are the flat rear flanks.

The invention is explained more fully below with reference to the example of embodiment illustrated in the drawing, in which:

FIG. 1 is a side view of the strap tongue and of the wedge on a toothed side,

FIG. 2 is a side view of the wedge, viewed in the direction II in FIG. 1,

FIG. 3 is a median section corresponding to FIG. 2,

FIG. 4 is a section on the line IV—IV in FIG. 3,

FIG. 5 is a plan view of the clamp head,

FIG. 6 is a sectional view in the direction of the arrow VI in FIG. 5,

Figure 7:
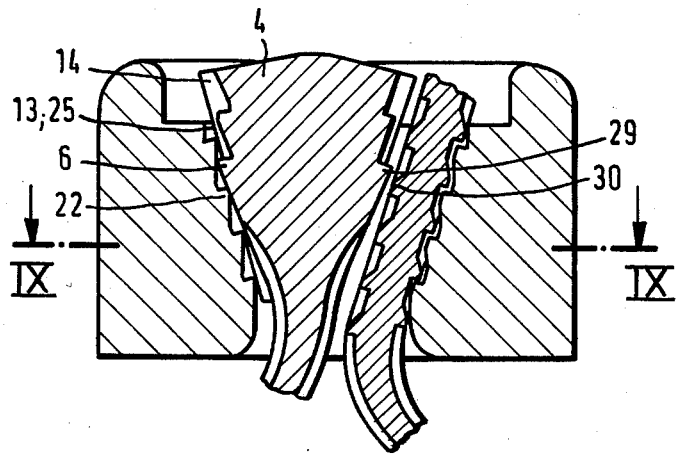
FIG. 7 is a sectional view, corresponding to FIG. 6, of the clamp head with the wedge and strap inserted without substantial tension.

According to FIG. 1, the main sides of the strap tongue 1 carry, in a central strip, a toothing 2, the cross-sectional shape of which can be seen in FIGS. 6 and 7, and on both sides of the toothing 2 have a flat edge strip 3, the surface of which lies in the same plane as the tips of the toothing 2. The strap is for example made of polyamide.

To one end of the strap the clamp wedge 4 is integrally fastened by its narrow end, so that its wedge surfaces 5 form the continuation of the toothed main surfaces of the strap. In the center of the wedge surfaces 5 is situated a toothing 6, which matchingly corresponds to the toothing 2 of the strap tongue, namely in the sense that the supporting front flanks 7 of the wedge teeth face the wider end of the wedge and the teeth of the strap tongue are oriented in the same direction, so that after a loop of 180° has been formed they are oriented oppositely and complementarily to the teeth of the wedge. The toothing 6 of the wedge is somewhat narrower than that of the strap tongue 1, so that it fits without difficulty between the edge strips 3 of the strap tongue. Edge strips 8 on the wedge surfaces 5 of the wedge correspond to these edge strips 3, and are set back, relative to the teeth, into the plane of the tooth bottom.

The side surfaces 9 of the wedge, which extend transversely to the wedge surfaces 5, are in line with the corresponding side surfaces 10 of the strap and are flat. From the wider end to beyond the middle region of the wedge they carry a plate-like projection 11, which on the one hand is bounded by a flat surface 12 parallel but projecting relative to the surface 9, and on the other hand by two wedge surfaces 13 roughly parallel to the wedge surfaces 5 but projecting in relation to them, and also, finally, by a step surface 19 joining the surfaces 9 and 12. On each side of the wedge, ledges 14 are formed, which project next to each wedge surface 5 and which are referred to as supporting edges. In the wider region of the wedge, the supporting edges project in relation to the toothing 6, while in the middle region of the wedge they remain behind the latter.

The wedge is symmetrical in shape in every direction and consists integrally of the same material as the strap tongue, preferably polyamide.

Figure 8:
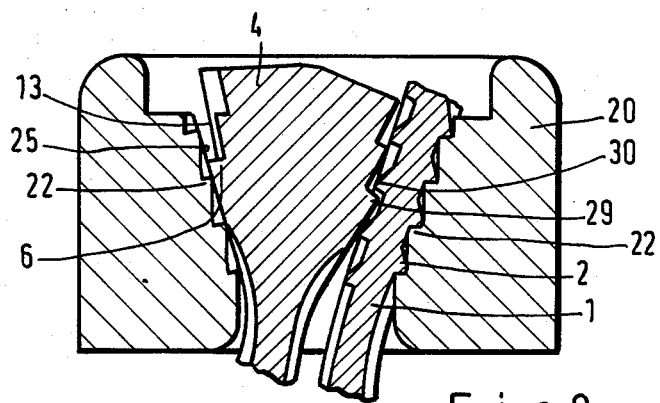
FIG. 8 is a view corresponding to FIG. 7, with higher strap tension.

The clamp head 20, which constitutes a part separate from the wedge of the strap tongue, also expediently consists of the same material. In the plan view shown in FIG. 5 it can be seen in the form of a frame, which is symmetrically closed on the side not shown in the Figure. The clamp head 20 contains an opening 21, which in FIGS. 5 and 6 is bounded on the right and left by opening surfaces converging in wedge shape and, on the sides extending transversely thereto, by side surfaces 23 parallel to one another. The opening surfaces enclose, together with the center line, a wedge angle of about 18°, which is approximately the same size as the wedge angle of the surfaces 13 of the supporting edges 14 of the wedge 4, and in their middle region 4 they carry teeth 22, the shape of which is complementary to that of the strap tongue. The side surfaces 23 are spaced apart by a distance only slightly greater than that between the side surfaces 12 of the wedge 4, so that the wedge can be inserted fittingly into the opening 21. The distance between the opening surfaces is so great that in addition to the wedge the strap tongue can also be inserted into the opening 21, as illustrated in FIGS. 7 and 8.

In the corner, at the transition between the opening surfaces and the side surface 23, the clamp head contains narrow ledges 24, which extend roughly parallel to the opening surfaces and in the present context are referred to as supporting edges. They correspond in respect of position and width to the supporting edges 14 of the wedge 4. Their mutually facing supporting surfaces 25 merge, close to the bottom end of the opening 21, into a step 26 extending transversely to the direction of the opening. The step 26 corresponds to the step surface 19 of the wedge. These surfaces cooperate to prevent the wedge 4 from being pulled out of the clamp head 20 in the downward direction through the action of excessive forces.

Figure 9:
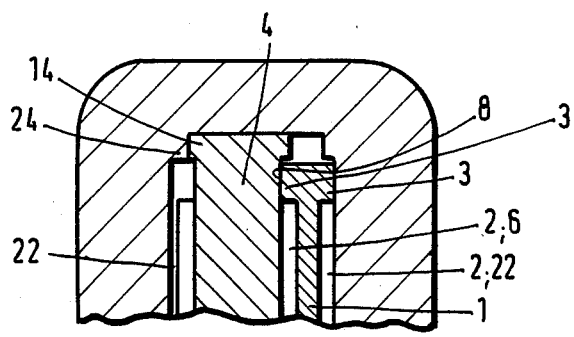
FIG. 9 is a section through the arrangement shown in FIG. 7, taken on the line IX—IX.

In the fitted condition (see FIGS. 8 and 9), the flux of the clamping forces in the clamp head travels from left to right over the following path: supporting surface 25 or teeth 22 of the clamp head, supporting surface 13 or teeth 6 of the clamp wedge, edge strip 8 and toothing 6 of the wedge surface 5, edge strip 3 or toothing 2 of the strap tongue 1 on its left side, toothing 2 of the strap tongue 1 on its right side, toothing 22 of the clamp head.

When the tie strap has been fitted and there is no substantial tension, the strap tongue 1 and the wedge 4 are situated in the opening 21 of the clamp head, for example in the position shown in FIG. 7. The teeth of the strap tongue 1 engage in the teeth 22 of the clamp head. Between the tie strap and the opposite opening surface lies the wedge, which in the example illustrated is shown more or less loose. If a certain tension is applied, it is pulled into the wedge-shaped space lying between the strap tongue 1 and the opposite opening surface until it lies in contact on both sides, while there is obviously no fitting configuration between the teeth of the wedge and the strap tongue. In particular, the teeth 29 and 30 lie against one another near their tips. If a greater force is now applied to the wedge, the tooth 29 is forced past the tooth 30 by elastic deformation until the clamp wedge 4 has assumed the position shown in FIG. 8, in which all the parts lie firmly against one another, but without complete, fitting engagement of the strap teeth into the teeth of the wedge. The traction of the wedge ensures firm, fitting engagement of the strap teeth in the teeth 22 of the clamp head, and thus also good transmission of forces. This condition is also maintained if greater forces occur, the clamp wedge 4 simply moving further forward with corresponding deformation of the teeth 29, 30 and of the neighboring teeth.

On the side of the clamp head remote from the strap tongue 1, the supporting surfaces 13 and 25 of the clamp wedge and of the clamp head slide one on the other. With increasing deformation, the teeth 6 of the clamp head can also engage in the tooth depressions between the teeth 22, whereby further resistance is offered to the wedging movement of the clamp head 4, without the pressing of the strap tongue against the opposite opening surface thereby being impaired.

While the forces of the strap tongue are transmitted directly to the teeth 22 of the clamp head, the forces transmitted from the strap directly to the clamp wedge are transmitted on the one hand via the supporting surfaces 13, 25 or the teeth 6, 12 to an opening surface of the clamp head. On the other hand, a certain transmission of forces also takes place from the clamp head via the teeth 29, 30 to the strap tongue and from the latter to the appertaining opening surface or its teeth 22. Whereas in conventional tie straps, of which the invention is an improvement, all the forces, including those originating from the clamped strap tongue, had to be transmitted via the clamp wedge and via wedge surfaces smooth on both sides to the clamp head, which led to correspondingly high wedging forces and deformations, in the tie strap according to the invention there is good distribution of forces, which for the most part can be transmitted, without direct action on the wedging forces, on the route via the toothing 22 from the clamp head.

Since the transmission of forces between the teeth 2 of the strap tongue 1 on the one hand and the teeth 6 of the clamp wedge on the other hand is not a decisive factor in respect of holding power under high tension, it is not necessary for the teeth 6 of the clamp wedge 4 to be made for an exactly complementary match with the teeth 2 of the strap tongue. It is simply necessary that they can be so reliably gripped by the teeth 2 of the strap tongue 1 that, even with varying strap tensions, which may possibly reach zero level, and with corresponding relative movements of the clamp wedge in relation to the clamp head, the clamp wedge 4 is always pulled back into the clamping position by the strap tongue. In the case of high forces, on the other hand, this function is not necessary, because then it can be expected that in any case adequate forces will be transmitted directly to the clamp wedge 4 connected to it, so that because of its wedging function the strap tongue which is to be clamped can remain secure in the correct position.

Since therefore high-quality engagement between the teeth 2 and 6 is not required, the teeth 6 may also have a different shape from that shown in the drawings, for example a flatter shape, so that in the fitting of the tie strap they will be able, more easily than is indicated by the difference between FIG. 7 and FIG. 8, to reach a position of maximum mutual engagement of all the parts.

We claim:

1. A tie strap, particularly useful for tying elongated objects, such as wiring harnesses, comprising, a strap tongue having at least one end, teeth disposed on both sides of said tongue, a clamp wedge having a thinner end and a thicker end, said wedge being joined by its thinner end to one end of the strap tongue and being toothed on both wedge surfaces, a clamp head having a clamp opening bounded by two opening surfaces which lie opposite one another and converge in the shape of a wedge, one of said surfaces being configured and dimensioned to support the wedge and the other surface forming, in conjunction with said one wedge surface, a clamp gap for said strap tongue , and teeth disposed on said surfaces.

2. A tie strap as claimed in claim 1, wherein the teeth on the opening surfaces are shaped to form a complementary match for the teeth on the strap tongue.

3. A tie strap as claimed in claim 1, wherein the opening surfaces and the wedge surfaces are provided, next to the toothing, with supporting surfaces which project relative to one another, cooperate on the side not forming the clamp gap, are not toothed, and prevent maximum engagement of the teeth at least in the condition of low tensional loading of the strap.

4. A tie strap as claimed in claim 2, wherein the opening surfaces and the wedge surfaces are provided, next to the toothing, with supporting surfaces which project relative to one another, cooperate on the side not forming the clamp gap, are not toothed, and prevent maximum engagement of the teeth at least in the condition of low tensional loading of the strap.

* * * * *